(12) United States Patent
Yamada

(10) Patent No.: US 10,068,350 B2
(45) Date of Patent: Sep. 4, 2018

(54) MEASUREMENT APPARATUS, SYSTEM, MEASUREMENT METHOD, DETERMINATION METHOD, AND NON-TRANSITORY COMPUTER-READABLE STORAGE MEDIUM

(71) Applicant: CANON KABUSHIKI KAISHA, Tokyo (JP)

(72) Inventor: Akihiro Yamada, Sakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 105 days.

(21) Appl. No.: 15/371,538

(22) Filed: Dec. 7, 2016

(65) Prior Publication Data

US 2017/0169581 A1   Jun. 15, 2017

(30) Foreign Application Priority Data

Dec. 15, 2015 (JP) .................................. 2015-244394

(51) Int. Cl.
*G06T 7/70* (2017.01)
*H04N 5/225* (2006.01)
*H04N 7/18* (2006.01)
*G06T 7/73* (2017.01)

(52) U.S. Cl.
CPC ................. *G06T 7/70* (2017.01); *G06T 7/73* (2017.01); *H04N 5/2256* (2013.01); *H04N 7/183* (2013.01); *G06T 2207/30164* (2013.01)

(58) Field of Classification Search
CPC ......... G06T 7/70; H04N 5/2256; H04N 7/183
See application file for complete search history.

(56) References Cited

U.S. PATENT DOCUMENTS

| | | | |
|---|---|---|---|
| 5,946,029 A | 8/1999 | Yoshimura et al. | |
| 8,497,995 B2 * | 7/2013 | Ota | G01B 11/30 356/601 |
| 2009/0315988 A1 * | 12/2009 | Fukazawa | G01N 21/21 348/126 |
| 2011/0157353 A1 * | 6/2011 | Takayama | H04N 7/183 348/135 |

(Continued)

FOREIGN PATENT DOCUMENTS

| | | |
|---|---|---|
| JP | 03289505 A | 12/1991 |
| JP | H109838 A | 1/1998 |

(Continued)

*Primary Examiner* — Bobbak Safaipour
(74) *Attorney, Agent, or Firm* — Rossi, Kimms & McDowell LLP

(57) ABSTRACT

The present invention provides a measurement apparatus for measuring at least one of a position and an attitude of a work using an image obtained by capturing the work onto which pattern light having periodically arrayed lines is projected, including a determination unit configured to determine, based on luminance information about a period direction of luminance unevenness generated, due to periodic shape unevenness of the work, in the image obtained by an image capturing unit, a base-line direction defined by a relative tilt direction between an optical axis of a projection unit and an optical axis of the image capturing unit with respect to the work so that a period direction of the pattern light is different from a period direction of the shape unevenness of the work.

12 Claims, 5 Drawing Sheets

(56) References Cited

U.S. PATENT DOCUMENTS

| | | | | |
|---|---|---|---|---|
| 2016/0267668 A1* | 9/2016 | Yamada | ............ | G01B 11/2509 |
| 2016/0273913 A1* | 9/2016 | Kitamura | ............... | G01B 11/25 |
| 2016/0334695 A1* | 11/2016 | Yamada | ............. | G03B 21/2013 |
| 2017/0299698 A1* | 10/2017 | Yagi | ...................... | G01S 7/4814 |
| 2017/0370706 A1* | 12/2017 | Nakatsukasa | ............. | G06T 7/40 |
| 2017/0370707 A1* | 12/2017 | Murakami | ............. | G01B 11/25 |
| 2017/0370708 A1* | 12/2017 | Fujiwara | ................ | G01B 11/25 |
| 2018/0085923 A1* | 3/2018 | Nammoto | .............. | B25J 9/1669 |

FOREIGN PATENT DOCUMENTS

| | | | |
|---|---|---|---|
| JP | 2007108002 A | 4/2007 | |
| JP | 2008241483 A | 10/2008 | |
| JP | 2009069866 A | 4/2009 | |

\* cited by examiner

MEASUREMENT APPARATUS, SYSTEM, MEASUREMENT METHOD, DETERMINATION METHOD, AND NON-TRANSITORY COMPUTER-READABLE STORAGE MEDIUM

BACKGROUND OF THE INVENTION

Field of the Invention

The present invention relates to a measurement apparatus for measuring at least one of the position and attitude of a work, a system, a measurement method, a determination method, and a non-transitory computer-readable storage medium.

Description of the Related Art

In recent years, a robot increasingly performs a complex task such as the assembly process of an industrial product, which has been conventionally done by a human. The robot performs assembly by gripping a part using an end effecter such as a hand. To implement such assembly, it is necessary to measure the position and attitude of an article (work) to be gripped.

For example, there is known a technique of measuring the position and attitude of a work by model fitting using measurement information (distance point group data) obtained from a range image. As a technique of obtaining a range image, there is generally known an active stereo method of irradiating a work with light having a pattern (projecting light having a pattern onto a work), capturing the pattern from a direction different from the irradiation direction of the light, and applying the principle of triangulation.

In the active stereo method, a pattern in an image is distorted due to luminance unevenness when capturing the pattern with which the work is irradiated, thereby causing a measurement error (distance measurement error). For example, shape unevenness is generated on the surface of a resin housing included in the work at the time of injection molding, thereby generating luminance unevenness on the work.

Techniques of correcting the distortion of a pattern caused by luminance unevenness are proposed in Japanese Patent Laid-Open Nos. 3-289505 and 2008-241483. In the technique disclosed in Japanese Patent Laid-Open No. 3-289505, a work is individually irradiated with light having a pattern and light having no pattern, thereby obtaining a pattern image corresponding to the light having the pattern and a total irradiation image corresponding to the light having no pattern. The distortion of the pattern caused by the luminance unevenness is corrected by correcting luminance unevenness in the pattern image by luminance unevenness in the total irradiation image. In the technique disclosed in Japanese Patent Laid-Open No. 2008-241483, a correction amount is determined in advance by obtaining the distortion of the pattern caused by the luminance unevenness, and is used to correct the distortion of the pattern at the time of actual measurement.

If the position and attitude of a work are measured while moving a robot to speed up the assembly process, it is necessary to obtain one range image by one image capturing operation.

However, in the technique disclosed in Japanese Patent Laid-Open No. 3-289505, to obtain one range image, it is necessary to perform an image capturing operation at least twice to obtain a pattern image and a total irradiation image (an image for luminance unevenness correction), and thus the timings of obtaining the respective images shift from each other. Consequently, a field shift occurs between the pattern image and the total irradiation image, and it is impossible to implement high-accuracy correction of the distortion of the pattern caused by the luminance unevenness. In addition, the distortion of the pattern caused by the luminance unevenness unwantedly changes depending on the irradiation direction of the pattern for the work.

On the other hand, in the technique disclosed in Japanese Patent Laid-Open No. 2008-241483, since the correction amount is determined in advance by obtaining the distortion of the pattern caused by the luminance unevenness, this technique is appropriate when the position and attitude of the work remain unchanged with respect to a measurement apparatus but is difficult to apply when the position and attitude of the work arbitrarily change.

SUMMARY OF THE INVENTION

The present invention provides a measurement apparatus advantageous in measuring at least one of the position and attitude of a work.

According to one aspect of the present invention, there is provided a measurement apparatus for measuring a position, an attitude, or the position and the attitude of a work using an image obtained by capturing the work onto which pattern light having periodically arrayed lines is projected, including a projection unit configured to project the pattern light onto the work, an image capturing unit configured to obtain an image by capturing the work onto which the pattern light is projected, a determination unit configured to determine, based on luminance information about a period direction of luminance unevenness generated, due to periodic shape unevenness of the work, in the image obtained by the image capturing unit, a base-line direction defined by a relative tilt direction between an optical axis of the projection unit and an optical axis of the image capturing unit with respect to the work so that a period direction of the lines of the pattern light is different from a period direction of the shape unevenness of the work, and an output unit configured to output control information for controlling a position, an attitude, or the position and the attitude of the projection unit, the image capturing unit, or the projection unit and the image capturing unit to have the base-line direction with respect to the work determined by the determination unit.

Further aspects of the present invention will become apparent from the following description of exemplary embodiments with reference to the attached drawings.

DESCRIPTION OF THE EMBODIMENTS

Figure 1:
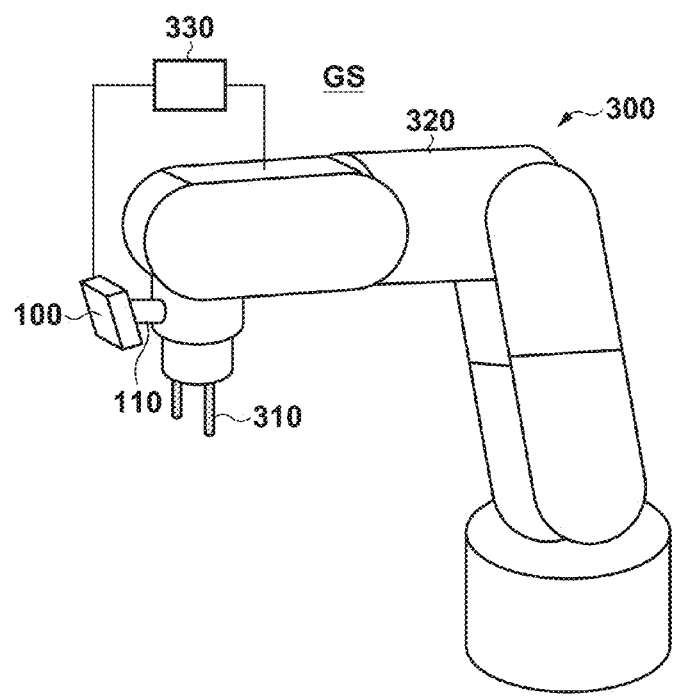
FIG. 1 is a schematic view showing the configuration of a gripping system according to one aspect of the present invention.

Preferred embodiments of the present invention will be described below with reference to the accompanying drawings. Note that the same reference numerals denote the same members throughout the drawings, and a repetitive description thereof will not be given.

FIG. 1 is a schematic view showing the arrangement of a gripping system GS according to one aspect of the present invention. The gripping system GS has a function of gripping (picking) a work as an article to be gripped in the assembly process of an industrial product or the like. The gripping system GS grips, for example, works irregularly piled on a tray. As shown in FIG. 1, the gripping system GS includes a measurement apparatus 100 and a gripping apparatus 300.

The measurement apparatus 100 adopts the active stereo method to measure at least one of the position and attitude (to be referred to as the "position and attitude" hereinafter) of a work using an image obtained by capturing the work onto which light (pattern light) having a pattern is projected. The measurement apparatus 100 is supported by (attached to) the gripping apparatus 300 as an external apparatus via a support unit 110. The practical arrangement and function of the measurement apparatus 100 will be described in detail in the following embodiments.

The gripping apparatus 300 is implemented as a six-axis arm robot which grips a work based on the position and attitude of the work measured by the measurement apparatus 100. As shown in FIG. 1, the gripping apparatus 300 includes a hand 310, a driving unit 320, and a control unit 330.

The hand 310 includes a plurality of fingers for gripping a work. In this embodiment, the hand 310 includes two fingers, and grips a work to be sandwiched between the two fingers.

Under the control of the control unit 330, the driving unit 320 drives the hand 310. As described above, the driving unit 320 supports, via the support unit 110, the measurement apparatus 100 attached near the hand 310, and also functions as a change unit for changing the position and attitude of the measurement apparatus 100. Although any arrangement well known in the art is applicable to the driving unit 320, the driving unit 320 is configured to three-dimensionally move and rotate the hand 310 and the measurement apparatus 100.

The control unit 330 includes a CPU and a memory, and controls the overall (operation of the) gripping apparatus 300. The control unit 330 determines, based on the position and attitude of the work measured by the measurement apparatus 100, gripping conditions including a gripping position when gripping the work by the hand 310 and an insertion direction when inserting the hand 310 into the work, and controls the driving unit 320 based on the gripping conditions. Furthermore, based on control information for controlling the position and attitude of the measurement apparatus 100, which is output from the measurement apparatus 100, the control unit 330 controls the driving unit 320 functioning as the change unit for changing the position and attitude of the measurement apparatus 100.

As will be described in the following embodiments, in the gripping system GS, it is possible to accurately measure the position and attitude of the work by the measurement apparatus 100, and it is thus possible to reduce a gripping error of the work (the breakage of the work by the hand 310, the drop of the work, or the like).

First Embodiment

Figure 2:
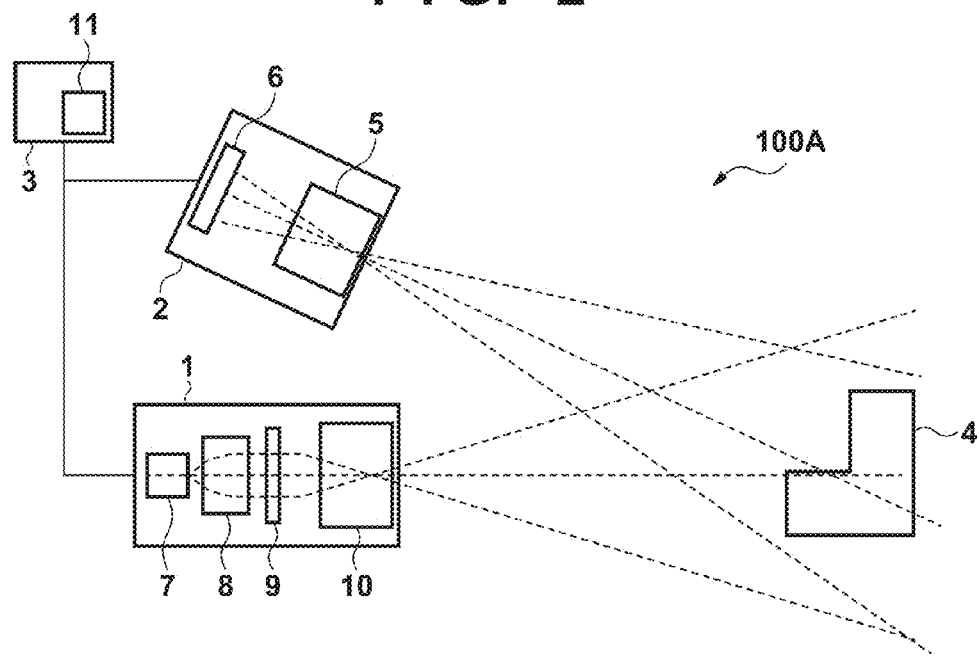
FIG. 2 is a schematic view showing the arrangement of a measurement apparatus according to the first embodiment.

FIG. 2 is a schematic view showing the arrangement of a measurement apparatus 100A applied as a measurement apparatus 100 in a gripping system GS. The measurement apparatus 100A includes a projection unit 1, an image capturing unit 2, and a processing unit 3, as shown in FIG. 2. The measurement apparatus 100A is an apparatus for measuring the position and attitude of a work 4 by model fitting using a range image obtained by a range image measurement unit. Note that model fitting is performed for a CAD model of the work 4 created in advance, and assumes that the three-dimensional shape of the work 4 is known.

Although not shown, the projection unit 1 and the image capturing unit 2 are integrally accommodated in a housing. The housing accommodating the projection unit 1 and the image capturing unit 2 is supported by a gripping apparatus 300 (driving unit 320) via a support unit 110 so as to be movable at six degrees of freedom. The attitude relationship between the measurement apparatus 100A and the gripping apparatus 300 is ensured in advance by calibration.

The range image measurement unit for obtaining a range image, which serves as the main part of the measurement apparatus 100A, will be described. The range image indicates three-dimensional information of (points on the surface of) the work 4 as a measurement target, and is an image in which each pixel has depth information. The range image measurement unit is formed from the projection unit 1, the image capturing unit 2, and the processing unit 3.

The projection unit 1 projects pattern light onto the work 4. The image capturing unit 2 obtains a pattern image by capturing the work 4, onto which the pattern light has been projected by the projection unit 1, from a direction (a direction tilting in a specific direction with respect to the projection unit 1) different from the projection unit 1. Based on the principle of triangulation, the processing unit 3 obtains a range image from the pattern image obtained by the image capturing unit 2. Furthermore, the processing unit 3 obtains information about the position and attitude of the work 4 by performing model fitting for the range image.

In the range image measurement unit, the pattern projected from the projection unit 1 onto the work 4 is a pattern which enables a range image to be obtained from one pattern image. This is because it is assumed to measure the position and attitude of the work 4 while moving the measurement apparatus 100A (the housing accommodating the projection unit 1 and the image capturing unit 2). In a measurement method of obtaining a range image from a plurality of pattern images, a field shift unwantedly occurs between range images due to the movement of the measurement apparatus 100A, and it is thus impossible to accurately obtain a range image.

Figure 3:
FIG. 3 is a view showing an example of the arrangement of the mask of a projection unit in the measurement apparatus shown in FIG. 2.

As a pattern which enables a range image to be obtained from one pattern image, there is known a dot line pattern encoded by dots, as shown in FIG. 3. A projection pattern and each line are associated based on the positional relationship of the dots of the dot line pattern projected onto the work 4, thereby obtaining a range image from one pattern image. Note that in this embodiment, the dot line pattern has been described as a practical example of the pattern projected from the projection unit 1 onto the work 4. However, the pattern projected from the projection unit 1 onto the work 4 is not limited to the dot line pattern, and any other pattern which enables a range image to be obtained from one pattern image is usable.

In this embodiment, the projection unit 1 includes a light source 7, an illumination optical system 8, a mask 9, and a projection optical system 10. The illumination optical system 8 is an optical system for uniformly illuminating the mask 9 with light emitted from the light source 7. A pattern (a transmitting portion corresponding to it) to be projected onto the work 4 is formed on the mask 9 by, for example, chromium-plating a glass substrate. In this embodiment, a dot line pattern is formed on the mask 9, as shown in FIG. 3. The projection optical system 10 is an optical system for projecting the image of the pattern formed on the mask 9 onto the work 4.

As described above, the projection unit 1 causes the illumination optical system 8 to uniformly illuminate the mask 9 with the light from the light source 7, and causes the projection optical system 10 to form, on the work 4, an image of the light from the pattern of the mask 9. In this embodiment, a method (fixed mask pattern method) of projecting the pattern onto the work 4 using the mask 9 has been described. The present invention, however, is not limited to this. For example, the pattern may be projected onto the work 4 using a DLP (Digital Light Processing) projector or a liquid crystal projector.

The image capturing unit 2 will be described. The image capturing unit 2 is a unit for obtaining a range image, and includes an image capturing optical system 5 and an image sensor 6 in this embodiment. The image capturing optical system 5 is an optical system for forming, on the image sensor 6, an image of the pattern projected onto the work 4. The image sensor 6 is an image sensor for obtaining a pattern image, and is formed from, for example, a CMOS sensor or a CCD sensor.

In the measurement apparatus 100A, luminance unevenness may be generated in a pattern image obtained by capturing the work 4 onto which the pattern light is projected. For example, if the work 4 includes a resin housing, shape unevenness is often generated on the surface of the housing at the time of injection molding. Such shape unevenness on the surface of the housing causes reflectance unevenness, thereby generating luminance unevenness in the pattern image obtained by the image sensor 6. If luminance unevenness is generated in the pattern image, the pattern in the pattern image is distorted, and thus a measurement error (distance measurement error) occurs, leading to deterioration in measurement accuracy of the position and attitude of the work 4.

Figure 4:
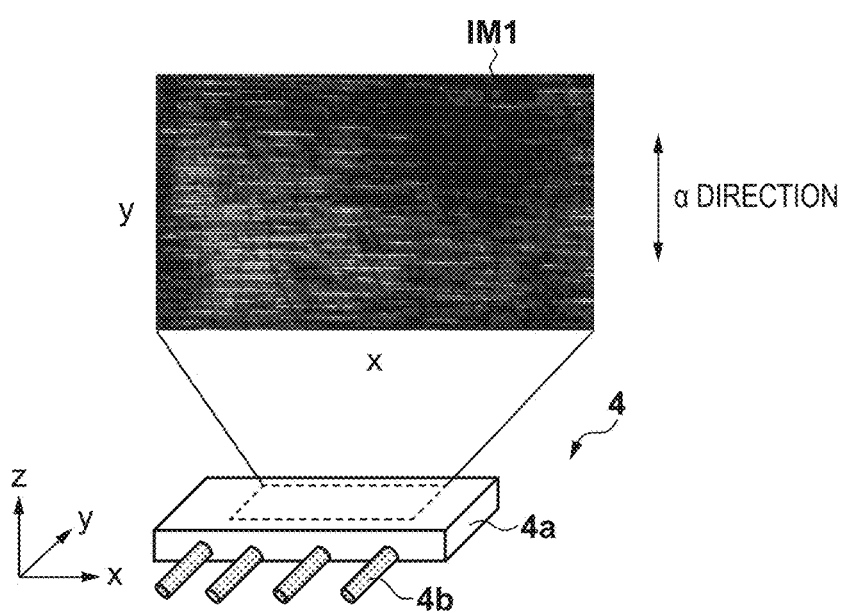
FIG. 4 is a view showing an example of luminance unevenness generated in an image due to a work.

FIG. 4 is a view showing an example of luminance unevenness (luminance distribution) generated in an image (grayscale image) obtained by capturing the work 4 when the work 4 includes a resin housing. The work 4 is, for example, an electronic part including a resin housing 4a and pins 4b. With reference to a grayscale image IM1 obtained by capturing the work 4 (the housing 4a thereof), it is apparent that luminance unevenness having periodicity in the a direction has been generated. Similarly to luminance unevenness, shape unevenness on the surface of the housing 4a of the work 4 has periodicity in the a direction, and luminance unevenness has been generated by a reflection characteristic caused by the shape unevenness.

The measurement apparatus 100A defines the relationship between the base-line direction and the period direction of the luminance unevenness, thereby measuring the position and attitude of the work 4. A direction in which the image capturing unit 2 relatively tilts with respect to the projection unit 1 to have a parallax, that is, a direction defined by the relative tilt direction between the optical axis of the projection unit 1 (projection optical system 10) and that of the image capturing unit 2 (image capturing optical system 5) will be described below as the base-line direction of the measurement apparatus 100A.

Figure 5A:
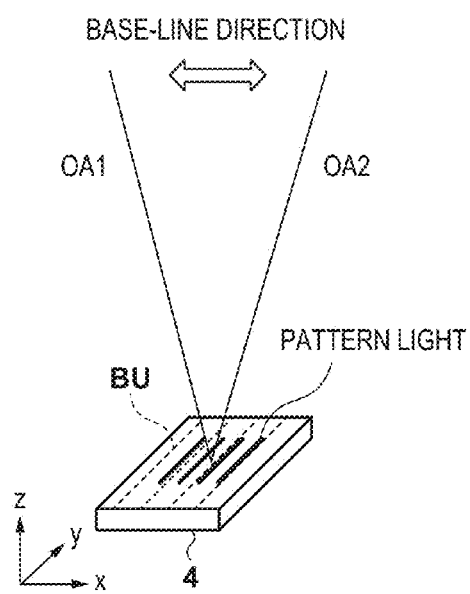
FIGS. 5A and 5B are views for explaining the relationship between a base-line direction and the period direction of the luminance unevenness.
Figure 5B:
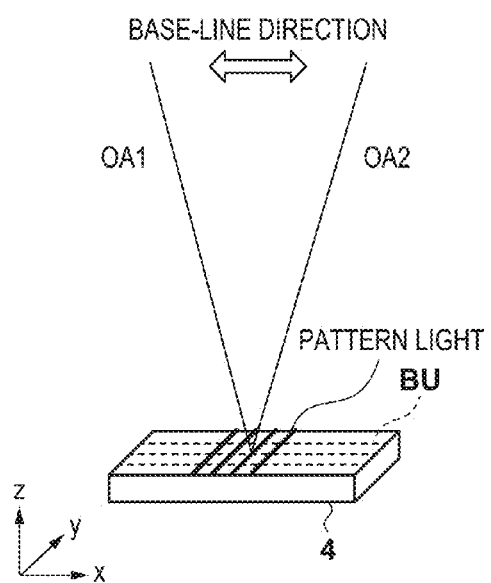

FIGS. 5A and 5B are views for explaining the relationship between the base-line direction and the period direction of the luminance unevenness caused by the work 4. Referring to FIGS. 5A and 5B, reference symbol OA1 denotes the optical axis of the projection optical system 10; and OA2, the optical axis of the image capturing optical system 5. In FIGS. 5A and 5B, the optical axis OA1 of the projection optical system 10 and the optical axis OA2 of the image capturing optical system 5 relatively tilt in the X direction, and thus the X direction serves as the base-line direction. The pattern light projected onto the work 4 by the projection optical system 10 has periodicity in the X direction. Reference symbol BU denotes luminance evenness (luminance distribution) generated in the pattern image obtained by capturing the work 4.

FIG. 5A shows a case in which the base-line direction is parallel to the period direction (X direction) of the luminance unevenness generated in the pattern image obtained by capturing the work 4, that is, a case in which the period direction of the luminance unevenness coincides with the period direction of the pattern light. In this case, the pattern in the pattern image tends to evenly become distorted in the distance calculation direction due to the luminance unevenness, and thus tends to have an offset value for each line. Therefore, when obtaining the position and attitude of the work 4 by performing model fitting for the range image, the possibility that a large measurement error is generated becomes high.

On the other hand, FIG. 5B shows a case in which the base-line direction is orthogonal to the period direction (Y direction) of the luminance unevenness generated in the pattern image obtained by capturing the work 4, that is, a case in which the period direction of the luminance unevenness is orthogonal to that of the pattern light. In this case, the possibility that the pattern in the pattern image is distorted in the distance calculation direction becomes low and the distortion direction varies in one line, thereby decreasing the average distance error. Therefore, when obtaining the position and attitude of the work 4 by performing model fitting for the range image, the averaging effect reduces the influence on a measurement error.

As described above, the relationship between the base-line direction and the period direction of the luminance unevenness generated in the pattern image obtained by capturing the work 4 changes the influence on a measurement error when obtaining the position and attitude of the work 4. Therefore, it is possible to accurately measure the position and attitude of the work 4 by making the base-line direction orthogonal to the period direction of the luminance unevenness when obtaining the pattern image by capturing the work 4.

A method of determining (obtaining) the period direction of the luminance unevenness will now be described. If the work 4 includes a resin housing, each type of work 4 generally has a similar characteristic of shape unevenness on the surface of the housing. This is because a die or molding process at the time of injection molding is the same. Therefore, it is possible to determine the period direction of the luminance unevenness for each type of work 4.

First, luminance unevenness is obtained for each type of work 4. More specifically, an image is obtained by capturing the work 4 in a state in which the work 4 is uniformly illuminated. At this time, in consideration of luminance unevenness generated in actual measurement of the position and attitude of the work 4, the illumination orientation and image capturing orientation for the work 4 are preferably made to coincide with the projection direction of the pattern light for the work 4. For example, in the measurement apparatus 100A, an image is obtained by capturing the work 4 by the image capturing unit 2 in a state in which the mask 9 is removed from the projection unit 1 (the optical path thereof) and the projection unit 1 uniformly illuminates the work 4. The processing unit 3 performs frequency analysis for image data corresponding to the image, thereby determining a direction in which the periodicity of the luminance unevenness is high, that is, the period direction. Note that processing for determining the period direction of the luminance unevenness need not be performed by the measurement apparatus 100A and part or all of the processing may be performed using an external measurement apparatus or information processing apparatus. The thus obtained period direction of the luminance unevenness is stored in a storage unit such as a memory 11 of the processing unit 3 as luminance information about the luminance unevenness for each type of work 4.

Figure 6A:
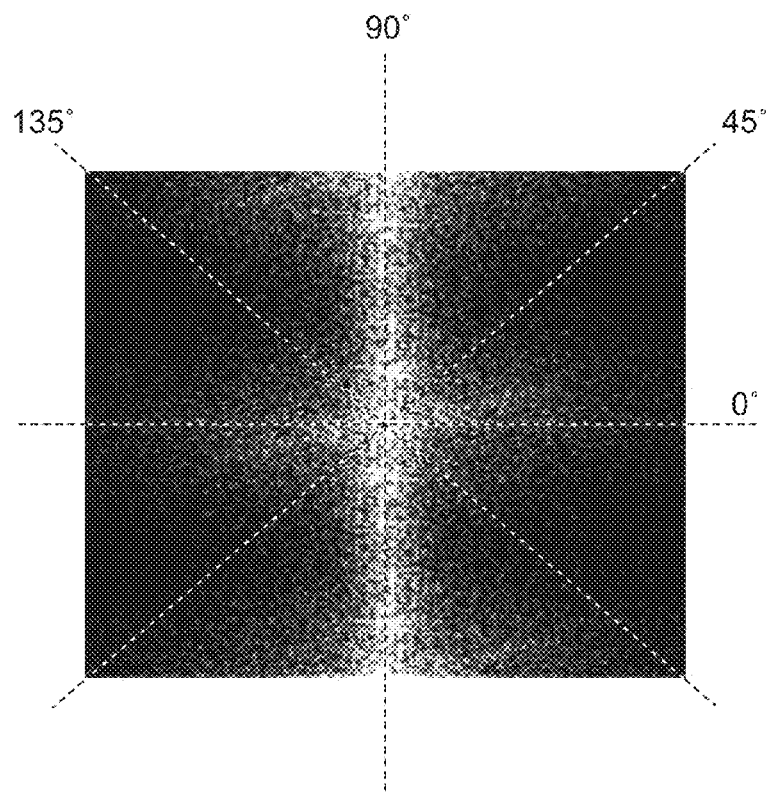
FIGS. 6A and 6B are views showing the result of performing frequency analysis for image data corresponding to an image obtained by capturing the uniformly illuminated work.
Figure 6B:
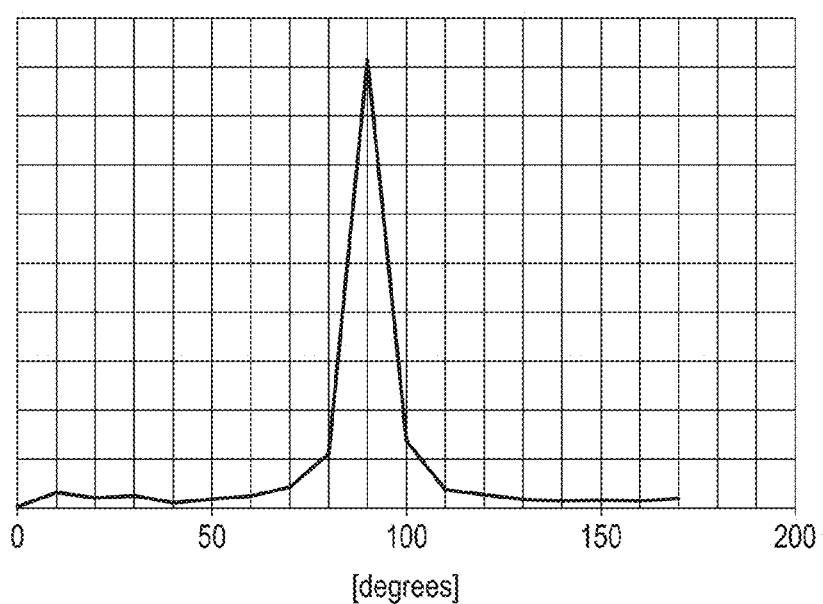

FIGS. 6A and 6B are views showing the result of performing frequency analysis for the image data corresponding to the image obtained by capturing the uniformly illuminated work 4. FIG. 6A shows the intensity distribution at each frequency obtained by performing two-dimensional FFT processing for the image data corresponding to the image obtained by capturing the uniformly illuminated work 4. In FIG. 6A, the frequency in the X direction is adopted as the abscissa, and the frequency in the Y direction is adopted as the ordinate. In FIG. 6B, the orientation direction is adopted as the abscissa, and a product-sum value for each orientation direction is adopted as the ordinate. FIG. 6B is a graph obtained by plotting the intensity distribution shown in FIG. 6A. Along the orientation direction, the product sum of values within a range of ±5° with respect to each orientation is obtained. The present invention, however, is not limited to this. With reference to FIG. 6B, since a peak appears in an orientation direction of 90°, it is apparent that the luminance unevenness caused by the work 4 has strong periodicity in the direction of 90°.

Measurement processing in the measurement apparatus 100A, that is, processing of measuring the position and attitude of the work 4 will be described. First, as the first measurement operation, in a state in which the base-line direction with respect to the work 4 is arbitrary, (the first information about) the position and attitude of the work 4 are obtained based on the image obtained by the image capturing unit 2. More specifically, by setting the projection unit 1 and the image capturing unit 2 to have arbitrary positions and attitudes, that is, regardless of the period direction of the luminance unevenness caused by the work 4, the projection unit 1 projects the pattern light onto the work 4 and the image capturing unit 2 captures the work 4, thereby obtaining a pattern image. The processing unit 3 obtains a range image from the pattern image, and performs model fitting for the range image, thereby obtaining the position and attitude of the work 4. Note that in the first measurement operation, the range image is obtained without defining the relationship between the base-line direction and the period direction of the luminance unevenness. Therefore, it is impossible to ensure the accuracy of the position and attitude of the work 4 obtained in the first measurement operation.

Next, the base-line direction with respect to the work 4 is determined based on the position and attitude of the work 4 obtained in the first measurement operation and the luminance information stored in the memory 11, that is, the period direction of the luminance unevenness and the predetermined position and attitude information of the measurement apparatus 100A at the time of the second measurement operation. More specifically, the processing unit 3 determines the base-line direction with respect to the work 4 so that the base-line direction and the period direction of the luminance unevenness have a preset relationship, more specifically, so that these directions are orthogonal to each other. The processing unit 3 generates control information for controlling the positions and attitudes of the projection unit 1 and the image capturing unit 2 to have the determined base-line direction with respect to the work 4, and outputs the information to the control unit 330 of the gripping apparatus 300. As described above, the processing unit 3 functions as a determination unit for determining the base-line direction with respect to the work 4 based on the luminance information, and also functions as an output unit for outputting the control information for controlling the positions and attitudes of the projection unit 1 and the image capturing unit 2.

As the second measurement operation, in a state in which the base-line direction and the period direction of the luminance unevenness are orthogonal to each other, (the second information about) the position and attitude of the work 4 are obtained based on the image obtained by the image capturing unit 2. More specifically, in the gripping apparatus 300, the control unit 330 controls the driving unit 320 based on the control information output from the processing unit 3 to change the base-line direction with respect to the work 4 from the state in the first measurement operation to a state in which the base-line direction and the period direction of the luminance unevenness are orthogonal to each other. In the state in which the base-line direction and the period direction of the luminance unevenness are orthogonal to each other, the projection unit 1 projects the pattern light onto the work 4, and the image capturing unit 2 captures the work 4, thereby obtaining a pattern image. Then, the processing unit 3 obtains a range image from the pattern image, and performs model fitting for the range image, thereby obtaining the position and attitude of the work 4. In the second measurement operation, the range image is obtained by defining the relationship between the base-line direction and the period direction of the luminance unevenness. Thus, it is possible to ensure the accuracy of the position and attitude of the work 4 obtained in the second measurement operation.

As described above, in the measurement apparatus 100A according to this embodiment, the base-line direction with respect to the work 4 is defined so that the base-line direction and the period direction of luminance unevenness are orthogonal to each other, and the position and attitude of the work 4 are obtained from the pattern image (range image) obtained in the state. Therefore, the measurement apparatus 100A can reduce the distortion of the pattern in the pattern image, thereby accurately obtaining the position and attitude of the work 4.

Second Embodiment

Figure 7:
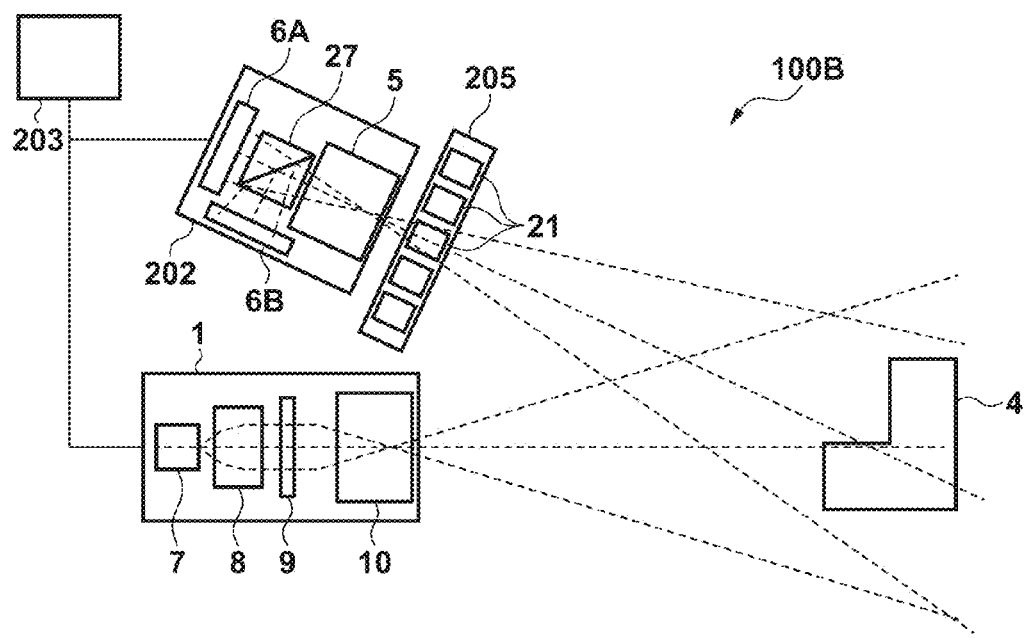
FIG. 7 is a schematic view showing the arrangement of a measurement apparatus according to the second embodiment.

FIG. 7 is a schematic view showing the arrangement of a measurement apparatus 100B applied as a measurement apparatus 100 in a gripping system GS. As shown in FIG. 7, the measurement apparatus 100B includes a projection unit 1, an image capturing unit 202, a processing unit 203, and an illumination unit 205. The measurement apparatus 100B is an apparatus for measuring the position and attitude of a work 4 by simultaneously obtaining a range image and a grayscale image by a range image measurement unit and a grayscale image measurement unit, and performing model fitting using the two images, that is, the range image and the grayscale image.

Although not shown, the projection unit 1, the image capturing unit 202, and the illumination unit 205 are integrally accommodated in a housing, and supported by a gripping apparatus 300 (driving unit 320) via a support unit 110. The attitude relationship between the measurement apparatus 100B and the gripping apparatus 300 is ensured in advance by calibration.

In the measurement apparatus 100B, the range image measurement unit for obtaining a range image is the same as in the first embodiment (measurement apparatus 100A), and a detailed description thereof will be omitted. As compared with the first embodiment, the image capturing unit 202 further includes a wavelength separation element 27 for separating light for a pattern image and light for a grayscale image. The image capturing unit 202 includes an image sensor 6A for obtaining a pattern image and an image sensor 6B for obtaining a grayscale image, instead of the image sensor 6.

The grayscale image measurement unit for obtaining a grayscale image, which serves as the main part of the measurement apparatus 100B, will be described. The grayscale image is a grayscale image obtained by capturing the uniformly illuminated work 4. In this embodiment, an edge corresponding to the contour or ridge of the work 4 is obtained from the grayscale image, and used as an image feature to obtain the position and attitude of the work 4. The grayscale image measurement unit is formed from the image capturing unit 202, the processing unit 203, and the illumination unit 205. The illumination unit 205 uniformly illuminates the work 4 with light of a wavelength different from that of pattern light from the projection unit 1. The image capturing unit 202 captures the work 4 uniformly illuminated by the illumination unit 205, thereby obtaining a grayscale image.

The illumination unit 205 includes a plurality of light sources 21, and is formed by arraying the plurality of light sources 21 in a ring to implement ring illumination in this embodiment. The illumination unit 205 uniformly illuminates the work 4 with ring illumination not to generate a shadow on the work 4. However, an illumination method for uniformly illuminating the work 4 is not limited to the ring illumination, and coaxial epi-illumination, dome illumination, or the like may be adopted.

The processing unit 203 performs edge detection processing for the grayscale image obtained by the image capturing unit 202, thereby obtaining the edge (edge image) of the work 4. As the algorithm of the edge detection processing, the Canny method and other various methods are available.

In the first embodiment, the period direction of the luminance unevenness caused by the shape unevenness (reflection characteristic) of the work 4 is obtained in advance, and stored in the storage unit. On the other hand, in this embodiment, period information of luminance unevenness is obtained from the grayscale image obtained to measure the position and attitude of the work 4.

Measurement processing in the measurement apparatus 100B, that is, processing of measuring the position and attitude of the work 4 will be described. First, as the first measurement operation, in a state in which the base-line direction with respect to the work 4 is arbitrary, (the first information about) the position and attitude of the work 4 are obtained based on the range image (first image) and the grayscale image (second image) obtained in the image capturing unit 202. More specifically, by setting the projection unit 1 and the image capturing unit 202 to have arbitrary positions and attitudes, that is, regardless of the period direction of the luminance unevenness caused by the work 4, the projection unit 1 projects the pattern light onto the work 4 and the illumination unit 205 uniformly illuminates the work 4. In this state, the image capturing unit 202 captures the work 4 to obtain a pattern image and a grayscale image. The processing unit 203 obtains a range image from the pattern image and an edge image from the grayscale image, and performs model fitting for the range image and the edge image, thereby obtaining the position and attitude of the work 4. However, in the first measurement operation, since the range image is obtained without defining the relationship between the base-line direction and the period direction of the luminance unevenness, it is impossible to ensure the accuracy of the position and attitude of the work 4 obtained in the first measurement pattern light.

Next, the processing unit 203 determines (obtains) the period direction of the luminance unevenness by performing frequency analysis for image data corresponding to the grayscale image. A process of determining the period direction of the luminance unevenness from the grayscale image is the same as in the first embodiment.

The processing unit 203 determines the base-line direction with respect to the work 4 based on the position and attitude of the work 4 obtained in the first measurement operation and luminance information obtained from the grayscale image, that is, the period direction of the luminance unevenness and the predetermined position and attitude information of the measurement apparatus 100B at the time of the second measurement operation. More specifically, the processing unit 203 determines the base-line direction with respect to the work 4 so that the base-line direction and the period direction of the luminance unevenness have a preset relationship, more specifically, so that these directions are orthogonal to each other. The processing unit 203 generates control information for controlling the positions and attitudes of the projection unit 1 and the image capturing unit 202 to have the determined base-line direction with respect to the work 4, and outputs the information to a control unit 330 of the gripping apparatus 300.

As the second measurement operation, in a state in which the base-line direction and the period direction of the luminance unevenness are orthogonal to each other, (the second information about) the position and attitude of the work 4 are obtained based on the image obtained by the image capturing unit 202. More specifically, in the gripping apparatus 300, the control unit 330 controls the driving unit 320 based on the control information output from the processing unit 203 to change the base-line direction with respect to the work 4 from the state in the first measurement operation to a state in which the base-line direction and the period direction of the luminance unevenness are orthogonal to each other. As described above, in the state in which the base-line direction and the period direction of the luminance unevenness are orthogonal to each other, the projection unit 1 projects the pattern light onto the work 4, and the illumination unit 205 uniformly illuminates the work 4. In this state, the image capturing unit 202 captures the work 4 to obtain a pattern image and a grayscale image. Then, the processing unit 203 obtains a range image from the pattern image and an edge image from the grayscale image, and performs model fitting for the range image and the edge image, thereby obtaining the position and attitude of the work 4. In the second measurement operation, since the range image and the grayscale image are obtained by defining the relationship between the base-line direction and the period direction of the luminance unevenness, it is possible to ensure the accuracy of the position and attitude of the work 4 obtained in the second measurement operation.

As described above, in the measurement apparatus 100B according to this embodiment, the base-line direction with respect to the work 4 is defined so that the base-line direction and the period direction of the luminance unevenness are orthogonal to each other, and the position and attitude of the work 4 are obtained from the pattern image (range image) and grayscale image obtained in the state. Therefore, the measurement apparatus 100B can reduce the distortion of the pattern in the pattern image, thereby accurately obtaining the position and attitude of the work 4.

In the gripping system GS, the driving unit 320 performs a moving operation until the measurement apparatus 100 is located at a final measurement position. Since, unlike the conventional technique, the measurement apparatus 100 need not obtain a plurality of images to correct the luminance unevenness, it is possible to measure the work 4 during the moving operation by the driving unit 320. Therefore, the above-described first measurement operation is performed during the moving operation by the driving unit 320 to define the relationship between the base-line direction and the period direction of the luminance unevenness in a measurement operation at the final measurement position, that is, the second measurement operation. This makes it possible to accurately measure the position and attitude of the work 4 without influencing the total tact time.

In the above-described embodiments, the processing unit 3 of the measurement apparatus 100A or the processing unit 203 of the measurement apparatus 100B generates control information for controlling the positions and attitudes of the projection unit 1 and the image capturing unit 2 or 202. The present invention, however, is not limited to this. For example, the control unit 330 of the gripping apparatus 300 can generate control information for controlling the positions and attitudes of the projection unit 1 and the image capturing unit 2 or 202. In this case, the measurement apparatus 100A or 100B outputs, to the control unit 330 of the gripping apparatus 300, the position and attitude of the work 4 obtained in the first measurement operation and the luminance information stored in the memory 11 or the luminance information obtained from the grayscale image. The control unit 330 of the gripping apparatus 300 determines the base-line direction with respect to the work 4 based on the position and attitude of the work 4 obtained in the first measurement operation, the luminance information, and the predetermined position and attitude information of the measurement apparatus 100A or 100B at the time of the second measurement operation. Then, the control unit 330 generates control information for controlling the positions and attitudes of the projection unit 1 and the image capturing unit 2 to have the determined base-line direction with respect to the work 4, and controls the driving unit 320 based on the control information.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-244394 filed on Dec. 15, 2015, which is hereby incorporated by reference herein in its entirety.

What is claimed is:

1. A measurement apparatus for measuring a position, an attitude, or the position and the attitude of a work using an image obtained by capturing the work onto which pattern light having periodically arrayed lines is projected, comprising:
   a projection unit configured to project the pattern light onto the work;
   an image capturing unit configured to obtain an image by capturing the work onto which the pattern light is projected;
   a determination unit configured to determine, based on luminance information about a period direction of luminance unevenness generated, due to periodic shape unevenness of the work, in the image obtained by the image capturing unit, a base-line direction defined by a relative tilt direction between an optical axis of the projection unit and an optical axis of the image capturing unit with respect to the work so that a period direction of the lines of the pattern light is different from a period direction of the shape unevenness of the work; and
   an output unit configured to output control information for controlling a position, an attitude, or the position and the attitude of the projection unit, the image capturing unit, or the projection unit and the image capturing unit to have the base-line direction with respect to the work determined by the determination unit.

2. The apparatus according to claim 1, further comprising:
   a support unit configured to cause an external apparatus, which changes the position, the attitude, or the position and the attitude of the projection unit, the image capturing unit, or the projection unit and the image capturing unit, to support the projection unit and the image capturing unit, wherein the output unit outputs the control information to the external apparatus, and the external apparatus changes the position, the attitude, or the position and the attitude of the projection unit, the image capturing unit, or the projection unit and the image capturing unit based on the control information.

3. The apparatus according to claim 1, further comprising:

a change unit configured to change the position, the attitude, or the position and the attitude of the projection unit, the image capturing unit, or the projection unit and the image capturing unit; and a control unit configured to control the change unit based on the control information output from the output unit.

4. The apparatus according to claim 1, wherein the determination unit determines the base-line direction with respect to the work so that the base-line direction and the period direction of the luminance unevenness are orthogonal to each other.

5. The apparatus according to claim 1, further comprising:

a processing unit configured to perform processing of obtaining information about at least one of the position and the attitude of the work based on the image, wherein the processing unit obtains first information about the position, the attitude, or the position and the attitude of the work based on an image obtained by the image capturing unit in a state in which the base-line direction with respect to the work is arbitrary, the determination unit determines the base-line direction with respect to the work based on the luminance information and the first information, and the processing unit obtains second information about the position, the attitude, or the position and the attitude of the work based on an image obtained by the image capturing unit in a state in which the base-line direction with respect to the work is changed from the state to the base-line direction with respect to the work determined by the determination unit.

6. The apparatus according to claim 1, further comprising:

a storage unit configured to store the luminance information, wherein the determination unit obtains the luminance information stored in the storage unit.

7. The apparatus according to claim 1, further comprising:

an illumination unit configured to uniformly illuminate the work with light of a wavelength different from a wavelength of the pattern light, wherein the image capturing unit obtains a first image by capturing the work onto which the pattern light is projected, and obtains a second image by capturing the work illuminated by the illumination unit, and the determination unit obtains the luminance information by performing frequency analysis for image data corresponding to the second image.

8. The apparatus according to claim 7, further comprising:

a processing unit configured to perform processing of obtaining information about the position, the attitude, or the position and the attitude of the work based on the first image and the second image, wherein the processing unit obtains first information about the position, the attitude, or the position and the attitude of the work based on the first image and the second image which have been obtained by the image capturing unit in a state in which the base-line direction with respect to the work is arbitrary, the determination unit determines the base-line direction with respect to the work based on the first information and the second image, and the processing unit obtains second information about the position, the attitude, or the position and the attitude of the work based on the first image and the second image which have been obtained by the image capturing unit in a state in which the base-line direction with respect to the work is changed from the state to the base-line direction with respect to the work determined by the determination unit.

9. A system including a measurement apparatus configured to measure a position, an attitude, or the position and the attitude of a work using an image obtained by capturing the work onto which pattern light having periodically arrayed lines is projected, and a gripping apparatus configured to grip the work based on the position, the attitude, or the position and the attitude of the work measured by the measurement apparatus, the measurement apparatus comprising a projection unit configured to project the pattern light onto the work, an image capturing unit configured to obtain an image by capturing the work onto which the pattern light is projected, a determination unit configured to determine, based on luminance information about a period direction of luminance unevenness generated, due to periodic shape unevenness of the work, in the image obtained by the image capturing unit, a base-line direction defined by a relative tilt direction between an optical axis of the projection unit and an optical axis of the image capturing unit with respect to the work so that a period direction of the lines of the pattern light is different from a period direction of the shape unevenness of the work, and an output unit configured to output, to the gripping apparatus, control information for controlling at least one of a position, an attitude, or the position and the attitude of the projection unit, the image capturing unit, or the projection unit and the image capturing unit to have the base-line direction with respect to the work determined by the determination unit, and the gripping apparatus comprising a change unit configured to support the projection unit and the image capturing unit, and change the position, the attitude, or the position and the attitude of the projection unit, the image capturing unit, or the projection unit and the image capturing unit, and a control unit configured to control the change unit based on the control information output from the output unit.

10. A measurement method of measuring a position, or an attitude, or the position and the attitude of a work using a measurement apparatus including a projection unit configured to project, onto the work, pattern light having periodically arrayed lines, and an image capturing unit configured to obtain an image by capturing the work onto which the pattern light is projected, the method comprising:

obtaining first information about the position, or the attitude, or the position and the attitude of the work based on an image obtained by the image capturing unit in a state in which a base-line direction defined by a relative tilt direction between an optical axis of the projection unit and an optical axis of the image capturing unit with respect to the work is arbitrary;

determining, based on the first information and luminance information about a period direction of luminance unevenness generated, due to periodic shape unevenness of the work, in the image obtained by the image capturing unit, the base-line direction with respect to the work so that a period direction of the lines of the pattern light is different from a period direction of the shape unevenness of the work; and obtaining second information about the position, or the attitude, or the position and the attitude of the work based on the image obtained by the image capturing unit by changing the base-line direction with respect to the work from the state to the determined base-line direction with respect to the work.

11. A method of, in a measurement apparatus including a projection unit configured to project, onto a work, pattern light having periodically arrayed lines and an image capturing unit configured to obtain an image by capturing the work onto which the pattern light is projected, determining a base-line direction defined by a relative tilt direction between an optical axis of the projection unit and an optical axis of the image capturing unit with respect to the work, the method comprising:

obtaining luminance information about a period direction of luminance unevenness generated, due to periodic shape unevenness of the work, in the image obtained by the image capturing unit; and determining, based on the luminance information, the base-line direction with respect to the work so that a period direction of the pattern light is different from a period direction of the shape unevenness of the work.

12. A non-transitory computer readable storage medium storing a program for causing a computer to execute a method of, in a measurement apparatus including a projection unit configured to project, onto a work, pattern light having periodically arrayed lines and an image capturing unit configured to obtain an image by capturing the work onto which the pattern light is projected, determining a base-line direction defined by a relative tilt direction between an optical axis of the projection unit and an optical axis of the image capturing unit with respect to the work, the program causing the computer to execute obtaining luminance information about a period direction of luminance unevenness generated, due to periodic shape unevenness of the work, in the image obtained by the image capturing unit, and determining, based on the luminance information, the base-line direction with respect to the work so that a period direction of the pattern light is different from a period direction of the shape unevenness of the work.

* * * * *